Dec. 27, 1966 P. D. BAYNE ETAL 3,294,289
DISPENSING UNIT
Filed Jan. 27, 1965 2 Sheets-Sheet 1

INVENTORS.
PETER D. BAYNE
JAMES J. SOLOMON
BY
Andrus & Starke
Attorneys

United States Patent Office 3,294,289
Patented Dec. 27, 1966

3,294,289
DISPENSING UNIT
Peter D. Bayne and James J. Solomon, Milwaukee, Wis., assignors to Jos. Schlitz Brewing Company, Milwaukee, Wis., a corporation of Wisconsin
Filed Jan. 27, 1965, Ser. No. 428,354
7 Claims. (Cl. 222—95)

This invention relates to a dispensing apparatus and more particularly to an apparatus for storing and dispensing a gas-containing liquid, such as beer or carbonated beverages.

Beer contains a substantial amount of carbon dioxide, generally in the range of 2.4 to 3.0 volumes of carbon dioxide per volume of beer. With keg or draft beer, it is necessary to maintain pressure on the beer within the keg in order to draw the beer from the keg and, secondly, to prevent the dissolved carbon dioxide from escaping from the beer. As beer is drawn from the keg, a void or space is produced in the keg. Unless pressure is continually applied to the beer, the carbon dioxide in the beer will tend to pass out of solution and fill the space. Thus, it is important to maintain a constant pressure on the beer. If the pressure on the beer is too low, it will result in the loss of carbon dioxide from the beer and a resulting loss of head. Conversely, if the pressure on the beer is too great, carbon dioxide will be driven into the beer, which will increase the carbon dioxide content beyond the desired limit.

In commercial establishments, the carbon dioxide, which is employed to maintain the pressure on the keg beer, is supplied from a pressurized tank and the desired pressure is maintained by a pressure regulator. While this system serves to maintain a uniform pressure on the beer, it is expensive and is not adapted for home or residential use. Prior to this invention, there has been no successful inexpensive, throw-away dispensing unit for residential use which will adequately maintain a uniform pressure on draft beer.

The present invention is directed to a disposable dispensing unit for storing and dispensing a gas-containing liquid, such as beer, which will maintain a uniform pressure on the beer as it is being drawn. According to the invention, the dispensing unit includes a semi-rigid, air permeable, outer carton which is made of cardboard, plastic or the like. The beer is contained within a flexible plastic bag located within the outer carton and suitable dispensing spigot is connected through the wall of the carton to the bag. To apply pressure to the beer within the bag, a second flexible bag is located within the carton and contains a pressurized gas. The gas within the second bag exerts a constant pressure against the beer in the first bag to aid in drawing beer from the first bag and to prevent dissipation of the carbon dioxide from the beer.

Both bags in the expanded condition, have a volume approximately equal to that of the outer carton or container. In the packaged state, the first bag is substantially full of beer, and the gas-containing bag will be in a collapsed state. As beer is withdrawn, gas will be supplied to the second bag to fill the void in the outer carton resulting from the withdrawal of beer and thereby maintain a constant pressure on the beer within the first bag at all times.

The present invention provides an inexpensive and disposable or throw-away unit which is capable of maintaining a substantially uniform pressure on the beer at all times. As the outer carton is made of cardboard or plastic and the bags are made of plastic, the entire unit can be thrown away and no deposit is required when the unit is purchased and no return of the unit is necessary.

Furthermore, the entire dispensing unit is fabricated of combustible material so that after use, the unit can be burned and this eliminates the problem of disposing of cans or bottles, as is normally required.

The dispensing unit is relatively small and compact, enabling it to fit on the shelf of a household refrigerator, or it can be readily handled and transported for picnics and the like.

Other objects and advantages will appear in the course of the following description.

The drawings illustrate the best mode presently contemplated for carrying out the invention.

Figure 1:
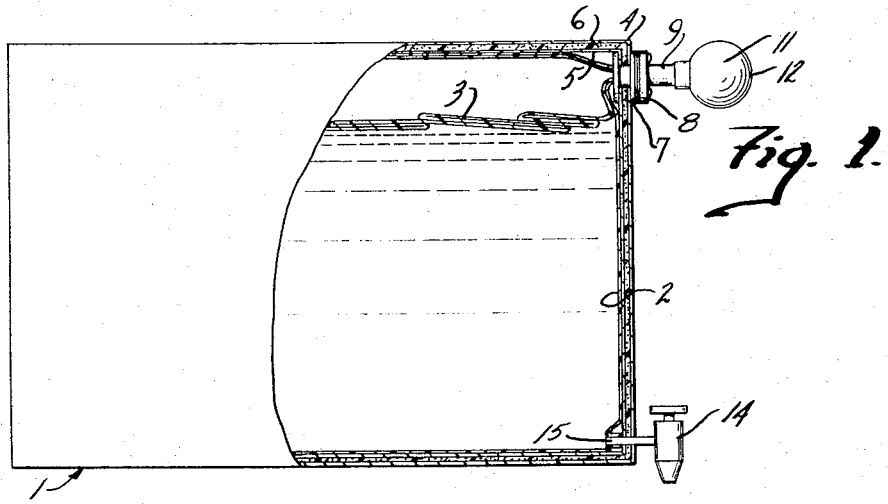
FIG. 1 is a vertical section of a dispensing unit of the invention showing the container in its initial state with the beer filling the bag.
Figure 3:
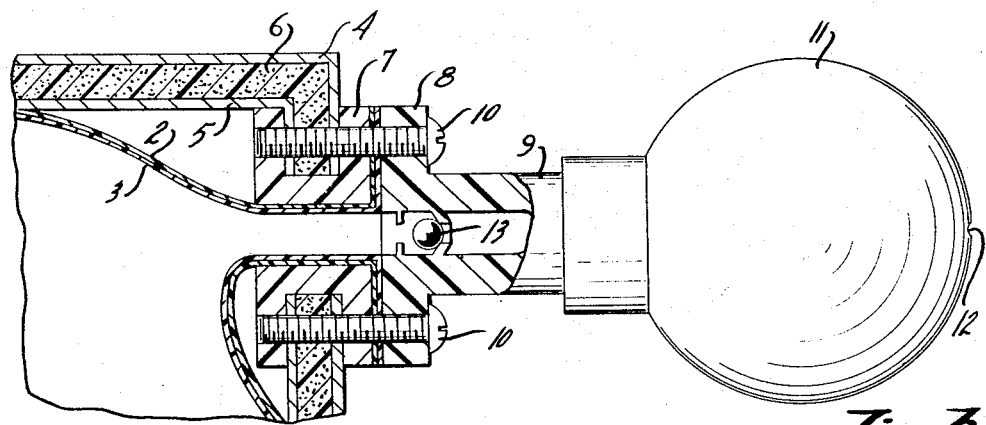
FIG. 3 is an enlarged fragmentary vertical section showing the attachment of the bags to the outer container.
Figure 2:
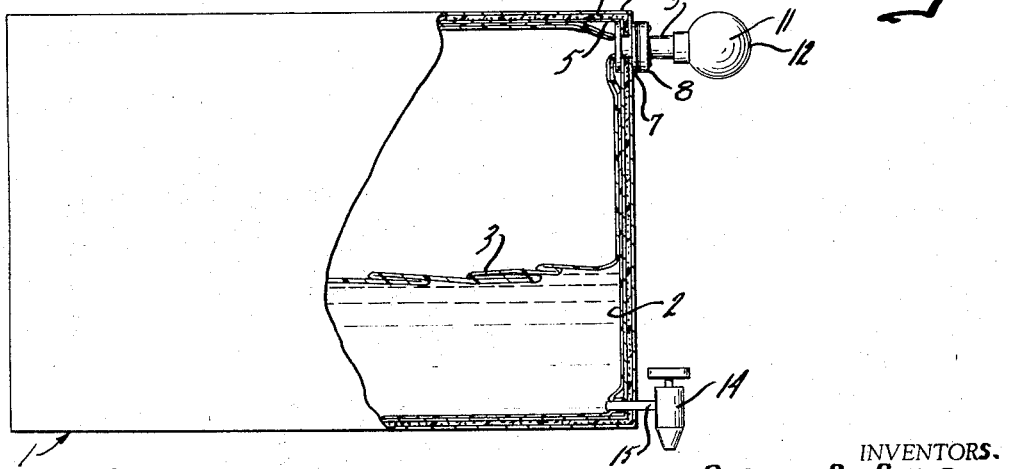
FIG. 2 is a view similar to FIG. 1 in which a substantial portion of the beer has been withdrawn from the unit.

FIGS. 1–3 illustrate a unit for storing and dispensing a gas-containing beverage, and includes an outer container or carton 1 which houses a pair of flexible bags 2 and 3. The bag 2 is adapted to contain beer, a carbonated beverage or other gas-containing liquid, while the bag 3 is adapted to contain a pressurized medium which serves to apply pressure to the liquid in the bag 2.

The container 1 may have various shapes, but as the dispensing unit is particularly adapted to be stored in a household refrigerator, the container is generally rectangular or cylindrical in cross-section so that it will conveniently fit on a shelf in a refrigerator. The container 1 is formed of an air-permeable, semi-rigid material, such as cardboard, plastic or the like. The container 1 is not a fluid-tight structure for it is not intended, in itself, to contain either a liquid or gas, but instead merely serves to house or confine the bags 2 and 3.

As the fluids within the bags 2 and 3 exert a substantial pressure against the walls of the container 1, it may be desirable to provide reinforcement for the container walls. As shown in FIG. 1, the walls can be formed with a laminated construction consisting of an outer wall 4 and an inner wall 5 of cardboard or plastic, separated by an intermediate layer or core 6 of foam plastic, such as polyurethane foam, which is bonded to the inner and outer walls. This laminated wall structure increases the strength and rigidity of the walls and also provides an insulating effect. The walls of the container can also be reinforced by other means, such as embedding metallic strips or other reinforcing members within the walls.

It is not necessary that the bags 2 and 3 be fabricated from elastic material, but merely from flexible material so that they can be collapsed and expanded. It is important, however, that the material from which the bag 2 is fabricated be impervious to the passage of carbon dioxide so that the carbon dioxide contained within the beer will not be dissipated through the bag. In this regard, it has been found that a laminated bag formed of bonded layers of a polyester resin film, such as Mylar, and a polyethylene film provide a very satisfactory material. The polyethylene film is heat sealable and the polyester film is impermeable to carbon dioxide so that this laminated bag structure can be readily fabricated and yet will be impermeable to the passage of carbon dioxide. However, other film combinations can also be employed for the bag 2.

As shown in FIG. 3, the end wall of the container is provided with an opening which is surrounded by an annular reinforcing member 7. The bag 3, which is adapted to contain the pressurizing gas, is disposed within the bag 2 and the necks of both bags extend through the opening in the wall of the container and are secured between the reinforcement 7 and the flange 8 of fitting 9. Suitable screws 10 or other fasteners extend through the flange 8 and reinforcement 7 to secure the necks of the bags between the members.

The outer end of the fitting 9 is connected to a resilient bulb 11 having an air inlet hole 12. The fitting is also provided with a conventional check valve 13 which permits the flow of air inwardly into the bag 3 but prevents the flow of air in the opposite direction. By squeezing the bulb 11, air can be pumped into the bag 3 and the air within the bag will exert a pressure outwardly on the beer within the bag 2.

Beer is withdrawn from the outer bag 2 by a conventional spigot unit 14 which is connected by tube 15 through the wall of the container 1 to the outer bag 2.

FIG. 1 illustrates the dispensing unit in the packaged form in which the beer substantially fills the outer bag 2, and the inner bag 3 is in a collapsed state and is located in the upper portion of bag 2. As beer is withdrawn from the outer bag 2, the level of the beer will drop and by squeezing the bulb 11, air will be forced into the inner bag 3 to partially expand the bag 3 and fill the void left in bag 2 by the withdrawal of beer. Thus, the pressure of the air within the inner bag 3 will be constantly exerted on the upper surface of the beer within the outer bag 2. The pressure exerted by the air within the inner bag 3 not only aids in withdrawing or removing beer from the container, but also serves to prevent the dissolved carbon dioxide within the beer from passing out of solution and filling the space or void left by the withdrawal of beer.

Figure 4:
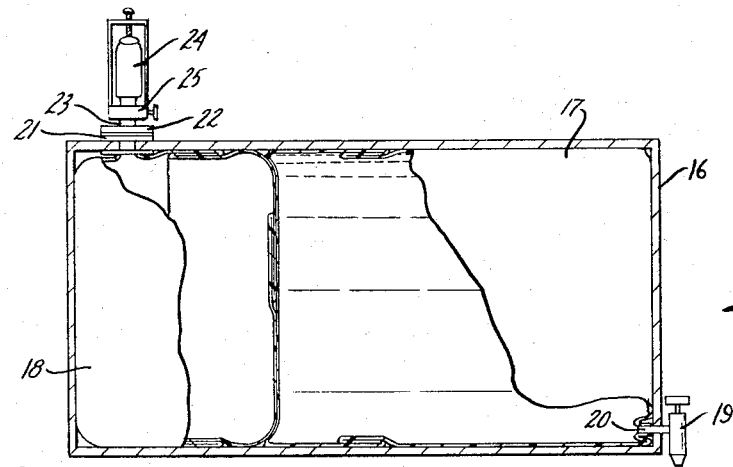
FIG. 4 is a modified form of the invention employing two side-by-side bags.

FIG. 4 illustrates a modified form of the invention which includes an outer container or carton 16 similar in structure to carton 1 of the first embodiment. A pair of bags 17 and 18 are located within a container 16 and are disposed in side-by-side relation. The bag 17 is adapted to contain beer or other gas-containing liquid, while the bag 18 is adapted to contain a pressurizing gas. The beer is drawn from the bag 17 by a spigot 19, similar to spigot 14 of the first embodiment, which is connected to the bag by a tube 20.

The neck of the gas bag 18 extends upwardly through an opening in the container 16 and is secured between an annular reinforcement 21 bordering the opening and the flange 22 of a valve fitting 23. A compressed gas cartridge 24 is connected to the fitting 23 and a manually operable valve mechanism 25 in fitting 23 controls the flow of gas into the bag 18. By manually adjusting the valve 25, the pressure of the carbon dioxide or other gas in cartridge 24 is exerted within the bag 18 to thereby maintain a substantially constant pressure on the beer within the bag 17.

As in the case of the first embodiment, both of the bags 17 and 18 have a volume substantially equal to the volume of carton 16. In its initial packaged state, the bag 17 containing the beer will substantially fill the container while the gas bag 18 will be in the collapsed state. As the beer is withdrawn, the valve 25 is actuated to expand bag 18 and fill the void resulting from the withdrawal of beer. When the beer has been substantially removed from the container the gas bag 18 will substantially fill the container.

Figure 5:
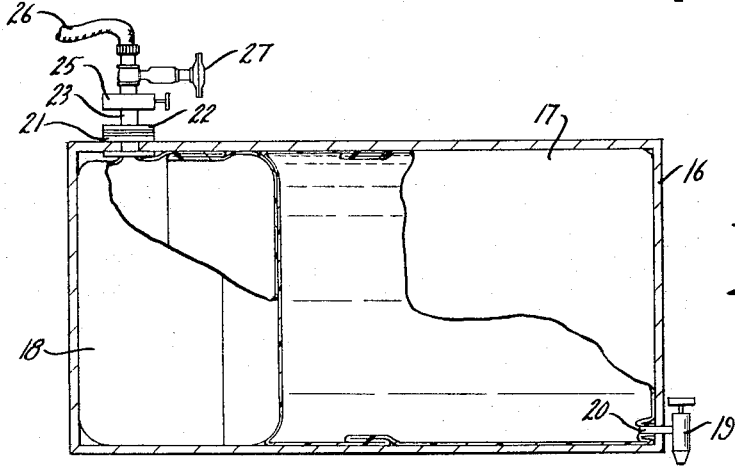
FIG. 5 is a second modified form of the invention in which water pressure is used as the pressurized fluid.

FIG. 5 illustrates an embodiment of the invention which is similar to that shown in FIG. 4 with the exception that the valve fitting 23 is connected with a hose 26 to a lawn faucet or other source of water pressure and a suitable pressure relief valve 27 is connected to fitting 23. With this structure, the water will fill the bag 18 and exert a pressure on the beer within the bag 17. The structure shown in FIG. 5 operates in a manner identical to that shown in FIG. 4.

Figure 6:
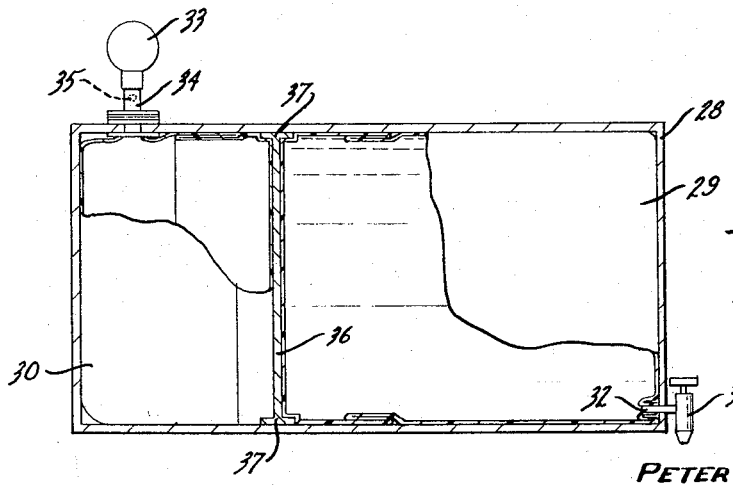
FIG. 6 is a further modified form of the invention showing the use of a moveable partition between the bags.

FIG. 6 illustrates another modified form of the invention including an outer carton 28, similar to carton 1, which houses a beer-containing flexible bag 29 and a gas-containing flexible bag 30. The bags 29 and 30 are similar to bags 2 and 3 and are arranged in a side-by-side relation.

The beer is withdrawn from the bag 29 through a spigot 31 which is connected to the bag by a tube 32.

As in the case of the first embodiment, air is supplied to the bag 3 by a bulb 33 which is connected through a fitting 34 to the neck of the bag 30. A suitable check valve 35 is located within the fitting 34 and permits the flow of air into the bag 30 but prevents flow of air in the opposite direction.

In this embodiment, a moveable partition wall 36 formed of cardboard, plastic, or the like, is located between the bags 29 and 30. The edges of the partition 36 are provided with flanges 37 which serve as guides and ride along the walls of the container as the partition is moved by expansion of the gas bag 30.

As beer is withdrawn from the bag 29 and air is supplied to the bag 30, the bag 30 will expand, and expansion of bag 30 will move the partition wall 36 within the container to apply a uniform pressure against the beer within the bag 29. The partition 36 also prevents the gas bag 30 from overriding the beer bag 29 and perhaps leaving pockets of undispensed beer in the bag. The flanges 37 provide an increased area of contact with the container walls to prevent jamming of the partition wall within the container.

The present invention provides an inexpensive dispensing unit, particularly adapted for household purposes, which maintains a substantially uniform pressure on the beer at all times. As all components of the unit, including the outer container and the bags, are made of inexpensive plastic or cardboard materials, the entire unit can be thrown away and no deposit is required when purchasing the unit and no return is required.

While the description was directed particularly to the dispensing unit being used in conjunction with a household refrigerator, it is contemplated that the dispensing unit, because of its small and compact size, can be used for a wide variety of purposes.

Various modes of carrying out the invention are contemplated as being within the scope of the following claims particularly pointing out and distinctly claiming the subject matter which is regarded as the invention.

We claim:

1. A unit to store and dispense a gas-containing liquid, comprising an outer container, a first flexible bag disposed within the container and containing a gas-containing liquid, said bag having an outlet opening therein, dispensing means disposed on the exterior of the container and entirely enclosing the outlet opening in said first bag for dispensing liquid from said first bag, said container having a hole therein, said first bag having a neck portion disposed in sealed relation to the portion of the container bordering said hole, a second bag disposed within the first bag and having a neck portion disposed within the neck portion of said first bag, and pressure supply means located on the exterior of the container and including valve means entirely enclosing the neck portion of the second bag for supplying a fluid under pressure to said second bag.

2. In a storage and dispensing unit, an outer gas permeable container, and a flexible bag containing a carbon dioxide-containing liquid and disposed within the container, said bag comprising a first layer of a heat sealable thermoplastic resin film and a second layer of a carbon dioxide-impermeable thermosetting resin film, said layers being bonded together to provide a laminated structure.

3. The structure of claim 2, in which the first layer is polyethylene film and the second layer is polyester film.

4. A unit to contain and dispense a gas-containing liquid, comprising an outer gas-permeable semi-rigid container, a first flexible bag disposed within the container and containing a first fluid to be dispensed, said bag having an outlet opening, dispensing means disposed on the exterior of the container and communicating with the outlet opening in said first bag for dispensing fluid from the bag, a second flexible bag disposed within the container in side-by-side relation with the first bag and containing a second fluid under pressure, and a movable pressure transmitting member disposed between the first and second bags, the pressure of the second fluid in the second bag acting through the pressure transmitting member and against the first fluid in said first bag to assist in drawing the first fluid from the first bag.

5. A unit to contain and dispense a gas-containing liquid, comprising an outer gas-permeable semi-rigid container, a first flexible bag disposed within the container and containing a gas-containing liquid, said bag having an outlet opening, dispensing means disposed on the exterior of the container and communicating with the outlet opening in said first bag for dispensing liquid from the bag, a second flexible bag disposed within the container in side-by-side relation with the first bag and containing a fluid under pressure, and a movable partition wall disposed between said bags, said wall having a frontal area substantially equal to the cross sectional area of the container, the pressure of the fluid in the second bag acting through the partition wall and against the liquid in said first bag to assist in drawing the liquid from the first bag and prevent dissipation of the gas from the gas-containing liquid.

6. The structure of claim 5 in which the wall is provided with a peripheral guide member disposed to ride on the inner surface of the container as the wall is moved within the container.

7. A unit to store and dispense a gas-containing liquid, comprising an outer container, a first flexible bag disposed within the container and containing a gas-containing liquid, said bag having an outlet opening therein, dispensing means disposed on the exterior of the container and extending through the wall of the container and entirely enclosing the outlet opening of said first bag, a second flexible bag freely disposed within the container and containing a pressurized fluid and having an outlet opening therein, and pressure supply means located on the exterior of the container and including valve means entirely enclosing the outlet opening in said second bag for supplying a fluid under pressure to said second bag, one of said bags being disposed within the other of said bags and the pressurized fluid in said second bag aiding in dispensing said gas-containing liquid from said dispensing means.

References Cited by the Examiner

UNITED STATES PATENTS

| | | | |
|---|---|---|---|
| 262,773 | 8/1882 | Hohl | 222—386.5 X |
| 2,564,163 | 8/1951 | Leperre | 222—386.5 X |
| 2,766,907 | 10/1956 | Wallace | 222—386.5 X |
| 2,978,144 | 4/1961 | Rilinger et al. | 222—95 |
| 3,037,652 | 6/1962 | Wallace. | |
| 3,153,414 | 10/1964 | Beall et al. | 222—95 |
| 3,189,231 | 6/1965 | Kibbel et al. | 222—386.5 X |

FOREIGN PATENTS

| | | |
|---|---|---|
| 628,313 | 10/1961 | Canada. |
| 740,635 | 11/1955 | Great Britain. |

M. HENSON WOOD, JR., *Primary Examiner.*

HADD S. LANE, ROBERT B. REEVES, *Examiners.*